United States Patent
Bowman

(10) Patent No.: US 10,486,510 B2
(45) Date of Patent: *Nov. 26, 2019

(54) BRACKET TO CONNECT INTERIOR DOOR TRIM GRAB HANDLE WITH INTEGRATED WINDOW REGULATOR CARRIER

(71) Applicant: Ford Global Technologies, LLC, Dearborn, MI (US)

(72) Inventor: Eric Bowman, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,692

(22) Filed: Apr. 30, 2019

(65) Prior Publication Data

US 2019/0255920 A1 Aug. 22, 2019

Related U.S. Application Data

(62) Division of application No. 15/651,518, filed on Jul. 17, 2017, now Pat. No. 10,350,973.

(51) Int. Cl.
*E05B 1/00* (2006.01)
*B60J 5/04* (2006.01)
*B60R 13/02* (2006.01)

(52) U.S. Cl.
CPC ........... *B60J 5/0434* (2013.01); *B60J 5/0416* (2013.01); *B60R 13/0243* (2013.01)

(58) Field of Classification Search
CPC . B60J 5/00; B60J 5/0422; B60J 5/0454; B60J 5/04; B60J 5/0425; B60J 5/0418; B60J 5/0416; B60R 13/0243; B60R 13/0206; B60R 2013/0287

USPC ............ 49/460, 502, 501; 296/146.7, 146.5, 296/146.6

See application file for complete search history.

(56) References Cited

U.S. PATENT DOCUMENTS

| | | | | |
|---|---|---|---|---|
| 4,648,208 A | * | 3/1987 | Baldamus | B60J 5/0416 49/502 |
| 5,232,261 A | * | 8/1993 | Kuroda | B60J 5/0444 296/146.4 |
| 5,355,629 A | ‡ | 10/1994 | Kimura | B60J 15/0416 296/14 |
| 5,529,370 A | ‡ | 6/1996 | Veit | B60J 5/042 296/14 |

(Continued)

*Primary Examiner* — Chi Q Nguyen
(74) *Attorney, Agent, or Firm* — Vichit Chea; Price Heneveld LLP

(57) ABSTRACT

A vehicle passenger door comprises: (a) an interior door trim panel; (b) a bracket connected to the interior door trim panel comprising: an elongated middle portion; a first end portion; and a second end portion opposite the first end portion; wherein both the first and second end portions have a first width at a first point and a second width wider than the first width at a second point parallel to the first width, the first point being closer to the elongated middle portion than the second point; and (c) an integrated window regulator carrier comprising: a vertical channel recessed into an interior facing side; a first receiver receiving the first end portion of the bracket disposed at a first side of the vertical channel; and a second receiver, opposing the first receiver, receiving the second end portion of the bracket at a second side of the vertical channel.

20 Claims, 20 Drawing Sheets

(56) References Cited

U.S. PATENT DOCUMENTS

| | | | |
|---|---|---|---|
| 5,897,157 A ‡ | 4/1999 | Yamaguchi et al. | ......................... B60R 16/0215 296/146.7 |
| 5,904,002 A ‡ | 5/1999 | Emerling | ............... B60J 5/0406 49/502 |
| 5,904,022 A | 5/1999 | Zadok | |
| 6,070,931 A ‡ | 6/2000 | Yamaguchi et al. | ......................... B60R 16/0215 296/146.7 |
| 6,168,226 B1 * | 1/2001 | Wycech | ............... B29C 44/1228 180/68.4 |
| 6,176,542 B1 ‡ | 1/2001 | Gooding et al. | ....... B60J 5/0416 296/146.5 |
| 6,381,906 B1 ‡ | 5/2002 | Pacella et al. | ......... B60J 5/0416 296/146.5 |
| 6,493,919 B2 ‡ | 12/2002 | Morrison et al. | ...... B60J 5/0416 29/281.4 |
| 6,615,546 B2 ‡ | 9/2003 | Furuyama | ............. B60J 5/0416 296/14 |
| 6,932,416 B2 ‡ | 8/2005 | Clauson | ............. B60R 13/0206 296/146.7 |
| 6,983,978 B2 ‡ | 1/2006 | Radu | ................... B60R 13/0243 296/14 |
| 7,380,865 B2 ‡ | 6/2008 | Eckhardt et al. | ....... B29C 45/14 296/146.2 |
| 8,602,483 B2 * | 12/2013 | Svedberg | ................. B60J 5/045 296/146.6 |
| 9,126,470 B2 * | 9/2015 | Kaliomaki | ............. B60J 5/0416 |
| 9,434,242 B2 ‡ | 9/2016 | Yamada | ................... B60J 10/75 |
| 10,350,973 B2 * | 6/2019 | Bowman | ................. B60J 5/045 |
| 2001/0030444 A1 ‡ | 10/2001 | Whitehead et al. | ......................... B29C 37/0032 296/146.7 |
| 2002/0046505 A1 ‡ | 4/2002 | Seksaria et al. | ....... B60J 5/0425 49/502 |
| 2002/0069609 A1 * | 6/2002 | Nees | ..................... B60J 5/0444 296/202 |
| 2003/0097798 A1 ‡ | 5/2003 | Staser | .................... B60J 5/0416 49/502 |
| 2009/0008959 A1 ‡ | 1/2009 | Rehn | ..................... B60J 5/0405 296/14 |
| 2009/0184501 A1 ‡ | 7/2009 | Hirotani | ................ B60J 5/0451 280/730.2 |
| 2013/0168996 A1 * | 7/2013 | Svedberg | ................ B60J 5/045 296/146.6 |
| 2014/0117706 A1 ‡ | 5/2014 | Fortin | .................... B60J 5/0416 296/146.6 |
| 2014/0125087 A1 * | 5/2014 | Kalliomaki | ............ B60J 5/0416 296/146.6 |
| 2015/0151616 A1 ‡ | 6/2015 | Makowski et al. | .... B60J 5/0456 296/146.6 |

\* cited by examiner
‡ imported from a related application

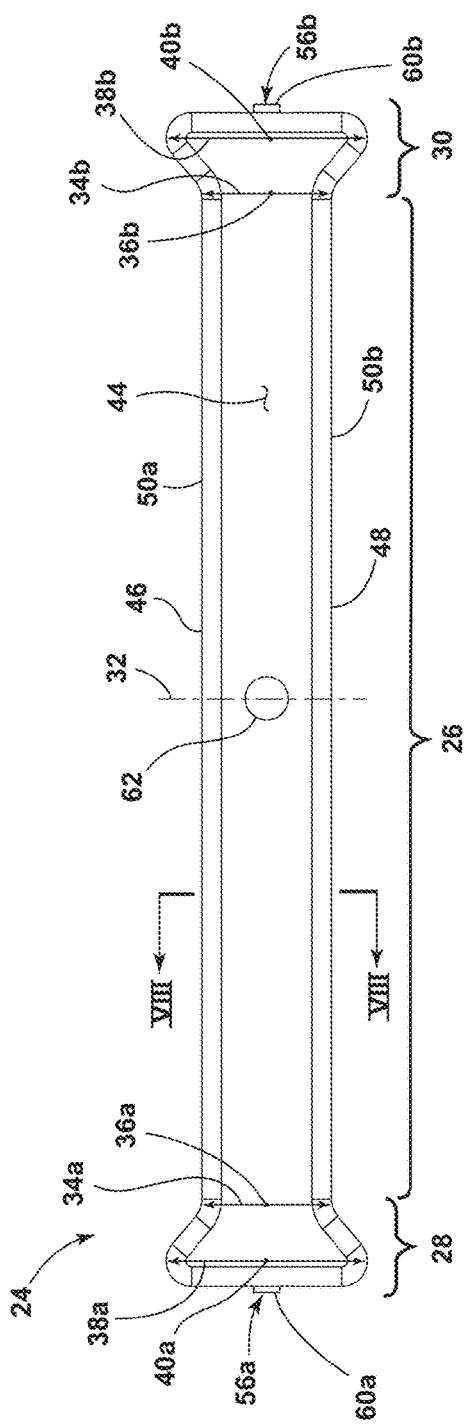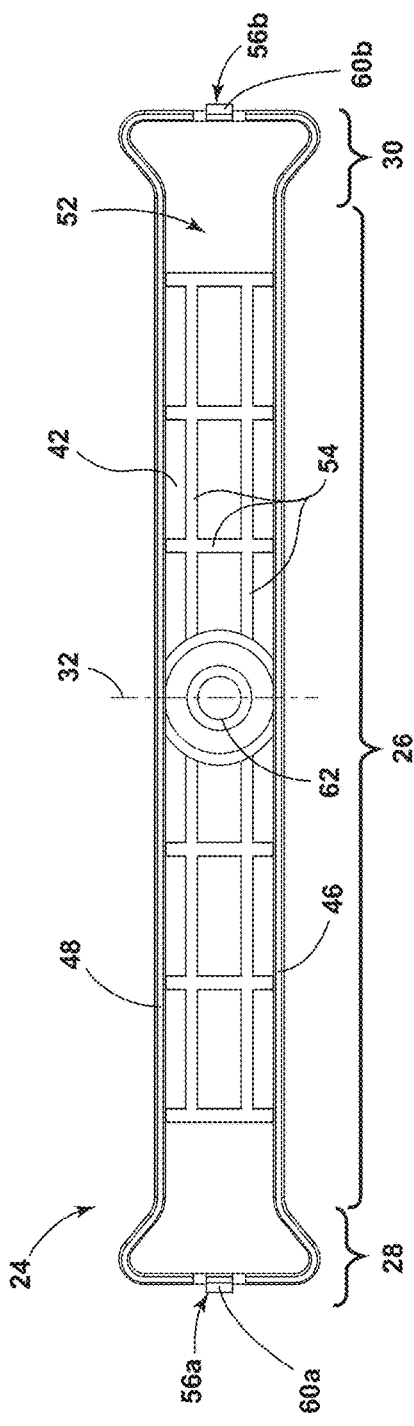
FIG. 4
FIG. 5

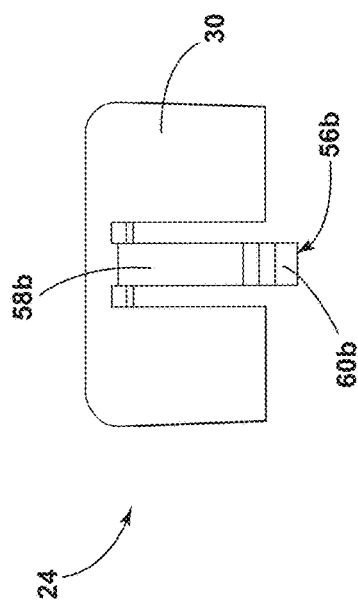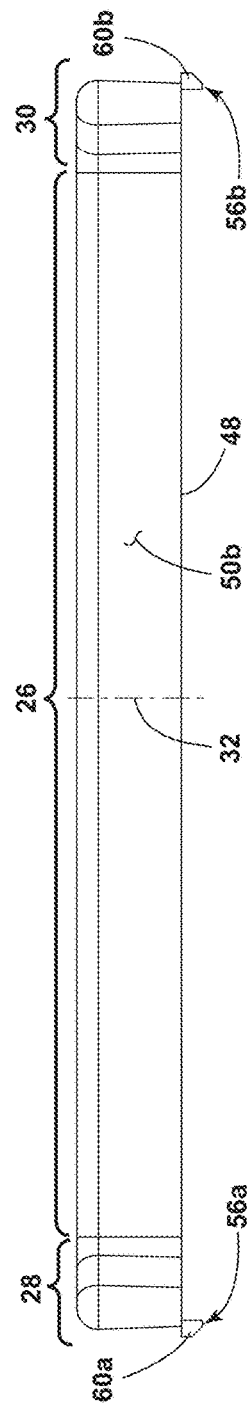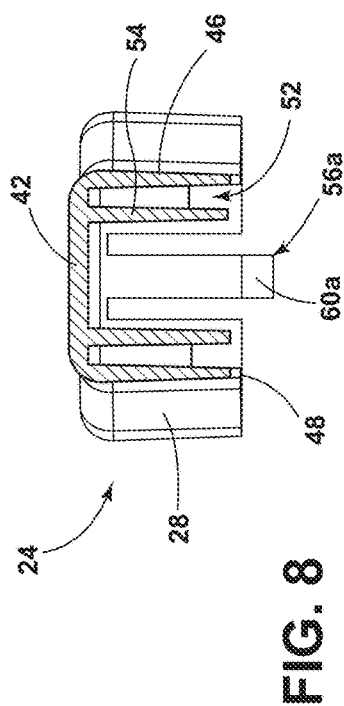

BRACKET TO CONNECT INTERIOR DOOR TRIM GRAB HANDLE WITH INTEGRATED WINDOW REGULATOR CARRIER

CROSS-REFERENCE TO RELATED APPLICATION

This application is a divisional of and claims priority to U.S. patent application Ser. No. 15/651,518, filed on Jul. 17, 2017 (now U.S. Pat. No. 10,350,973), entitled "BRACKET TO CONNECT INTERIOR DOOR TRIM GRAB HANDLE WITH INTEGRATED WINDOW REGULATOR CARRIER," the contents of which are relied upon and incorporated herein by reference in their entirety.

FIELD OF THE INVENTION

The present invention generally relates to a passenger door assembly for a vehicle and, more specifically, to the attachment of an interior door trim to an integrated window regulator carrier.

BACKGROUND OF THE INVENTION

A passenger door assembly for a vehicle sometimes utilizes an integrated window regulator carrier attached to, or as part of, a frame and an interior door trim to cover the integrated window regulator carrier and part of the frame. An interior door trim sometimes includes a grab handle for a passenger to grab to close the passenger door assembly.

SUMMARY OF THE INVENTION

According to a first aspect of the present invention, an integrated window regulator carrier for a door of a vehicle comprises: an interior facing side; a vertical channel recessed into the interior facing side; a first receiver for a bracket disposed at a first side of the vertical channel projecting outward from the interior facing side; and a second receiver, opposing the first receiver, for the bracket disposed at a second side of the vertical channel also projecting outward from the interior facing side; wherein the first receiver and the second receiver each include a first retaining surface and a second retaining surface opposite the first retaining surface that faces the first retaining surface.

Embodiments of the first aspect of the invention can include any one or a combination of the following features:
  the first receiver and the second receiver each further include a bottom retaining surface between the first retaining surface and the second retaining surface;
  the bottom retaining surface, the first retaining surface, and the second retaining surface are planar;
  the first retaining surface and the second retaining surface are orthogonal to the bottom retaining surface;
  the first receiver and the second receiver each further include a planar lateral retaining surface orthogonal to the bottom retaining surface and orthogonal to the first retaining surface and the second retaining surface;
  the lateral retaining surface of the first receiver faces the lateral retaining surface of the second receiver;
  the first receiver and the second receiver each further comprise a snap-fit receiver to connect with a snap-fit fastener;
  the lateral retaining surface of both the first receiver and the second receiver has a planar portion, which has a length parallel to the bottom retaining surface;
  the length of the planar portion of the lateral retaining surface of both the first receiver and the second receiver is longer than a parallel distance between the first retaining surface and the second retaining surface;
  both the first receiver and the second receiver comprise: a first transition surface portion orthogonal to the bottom surface and forming a contiguous surface transition between the first retaining surface and the lateral retaining surface; and a second transition surface portion orthogonal to the bottom surface and forming a contiguous surface transition between the second retaining surface and the lateral retaining surface;
  the transition from the first retaining surface and the first transition surface portion forms an obtuse angle; and
  the transition from the second retaining surface and the second transition surface portion forms an obtuse angle.

According to a second aspect of the present invention, a passenger door assembly for a vehicle comprises: (a) an interior door trim panel; (b) a bracket connected to the interior door trim panel, the bracket comprising: an elongated middle portion; a first end portion; and a second end portion opposite the first end portion; wherein both the first end portion and the second end portion have a first width at a first point and a second width at a second point parallel to the first width, the second width being wider than the first width, and the first point being closer to the elongated middle portion than the second point; and (c) an integrated window regulator carrier comprising: an interior facing side; a vertical channel recessed into the interior facing side; a first receiver receiving the first end portion of the bracket disposed at a first side of the vertical channel projecting outward from the interior facing side; and a second receiver, opposing the first receiver, receiving the second end portion of the bracket disposed at a second side of the vertical channel also projecting outward from the interior facing side.

Embodiments of the second aspect of the invention can include any one or a combination of the following features:
  the bracket further comprises a top wall with planar top surface extending from the first end portion to the second end portion, the first receiver and the second receiver each further include a bottom retaining surface between the first retaining surface and the second retaining surface, wherein the bottom retaining surface of the first receiver and the second receiver faces the bracket;
  the bracket further comprises: a first side wall extending downward relative to the top wall, the first side wall extending from the first end portion to the second end portion;
  and a second side wall opposite the first side wall also extending downward relative to the top wall, the second side wall extending from the first end portion to the second end portion; wherein the first retaining surface of the first receiver faces the first side wall of the bracket; wherein the second retaining surface of the first receiver faces the second side wall of the bracket;
  the interior door trim panel comprises: an interior side opposite a side that faces the integrated window regulator carrier; and a grab handle located at the interior side;
  wherein the grab handle forms a recess into the interior door trim panel at the interior side and a protrusion on the side that faces the integrated window regulator carrier; and wherein the interior door trim panel is connected with the bracket at the protrusion;

the interior door trim panel is interconnected with the bracket at the elongated middle portion of the bracket;

the protrusion has a planar horizontal surface that faces the planar top surface of the top wall of the bracket;

the bracket further comprises one or more snap-fit fasteners; and the first receiver and the second receiver of the integrated window regulator carrier each further comprise a snap-fit receiver that has connected with a snap-fit fastener of the one or more snap-fit fasteners.

According to a third aspect of the present invention, a bracket comprises: an elongated middle portion; a first end portion; and a second end portion opposite the first end portion; wherein both the first end portion and the second end portion have a first width at a first point and a second width at a second point, the second width being wider than the first width, and the first point being closer to the elongated middle portion than the second point.

Embodiments of the third aspect of the invention can include any one or a combination of the following features:

a planar top surface extending from the first end portion to the second end portion;

a first side wall extending downward relative to the top wall, the first side wall extending from the first end portion to the second end portion;

a second side wall opposite the first side wall also extending downward relative to the top wall, the second side wall extending from the first end portion to the second end portion;

the first side wall has a planar exterior surface portion that is orthogonal to the planar top surface portion of the top wall;

the second side wall has a planar exterior surface portion that is orthogonal to the planar top surface of the side wall;

strengthening portions;

the first side wall, the second side wall, and the top wall form an interior chamber and the strengthening portions are disposed within the interior chamber;

one or more snap-fit fasteners; and the one or more snap-fit fasteners extend downward relative to the top wall and comprise a cantilever portion that terminates with a catch flange.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is an overhead view of the bracket of FIG. 2, illustrating the first end portion and the second end portion having a first width at a first point and a wider second width at a second point;

FIG. 5 is an underneath view of the bracket of FIG. 2, illustrating the elongated middle portion having a first side wall, a second side wall, and a top wall forming an interior chamber;

FIG. 6 is a side view of the bracket of FIG. 2, illustrating a snap-fit fastener at the second end portion having a cantilever portion terminating with a catch flange;

FIG. 7 is a side view of the bracket of FIG. 2, illustrating a planar exterior surface of the second side wall and the symmetrical shape of the bracket about a midline;

FIG. 8 is a cross-sectional view of the bracket of FIG. 2 taken through line VIII-VIII of FIG. 4, illustrating strengthening portions disposed within the interior chamber;

DETAILED DESCRIPTION OF THE PREFERRED EMBODIMENTS

Figure 1:
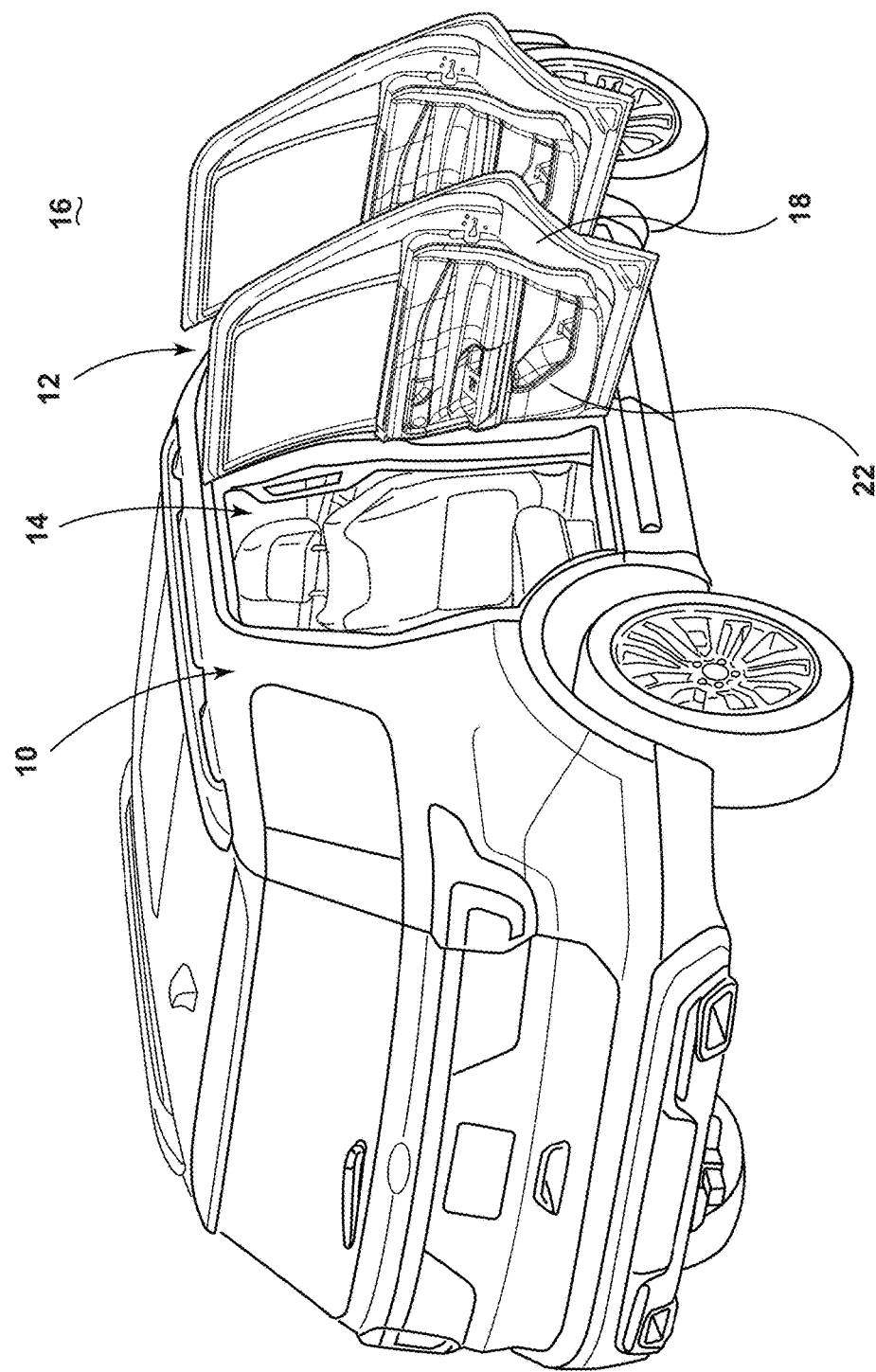
FIG. 1 is a perspective view of a vehicle illustrating a passenger door assembly with an interior door trim panel and a frame.
Figure 2:
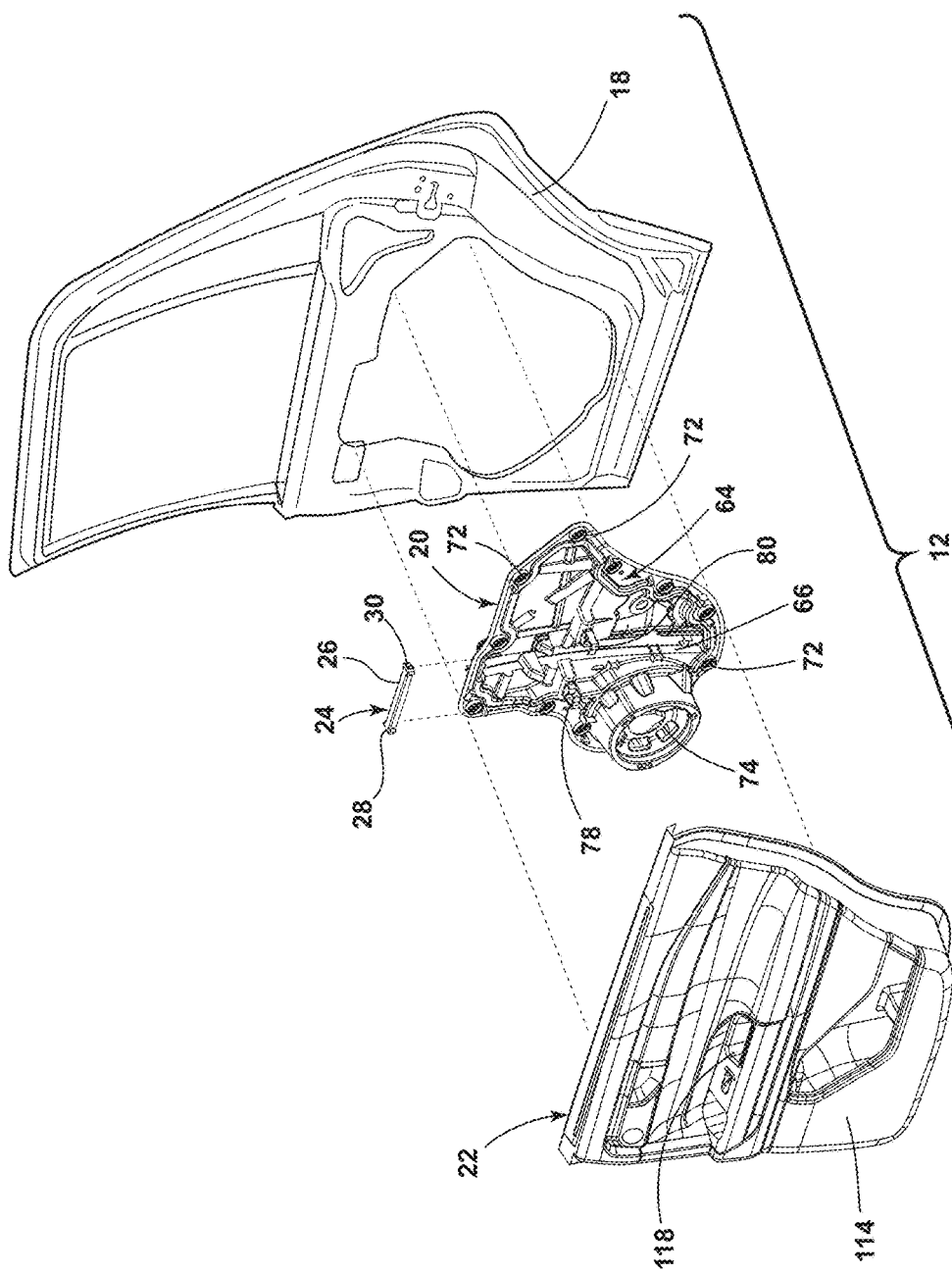
FIG. 2 is an exploded perspective view of components of the passenger door of FIG. 1, including an integrated window regulator carrier and bracket of the present disclosure.
Figure 3:
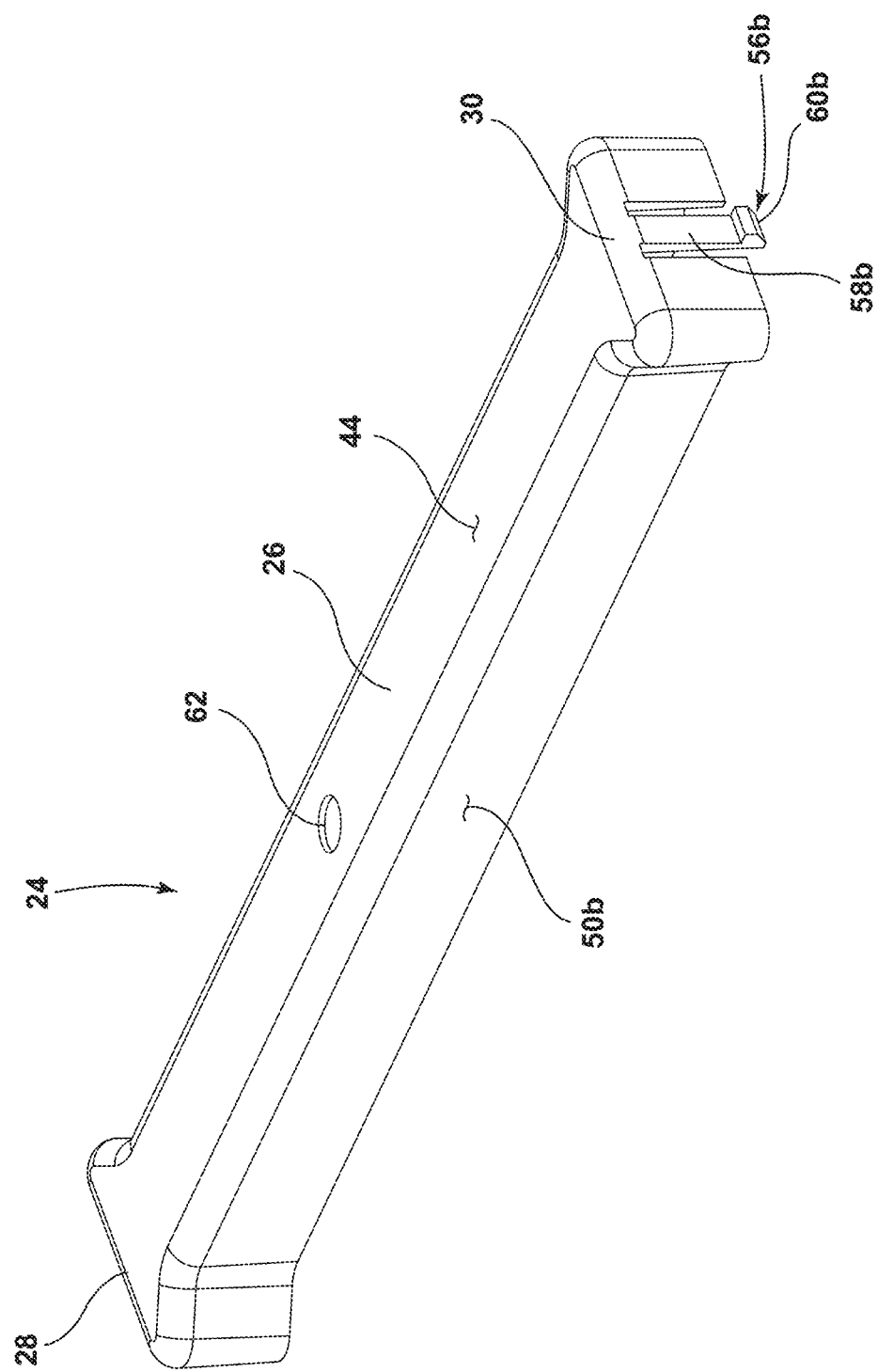
FIG. 3 is a perspective view of the bracket of FIG. 2 illustrating an aperture disposed at an elongated middle portion between a first end portion and a second end portion.
Figure 9:
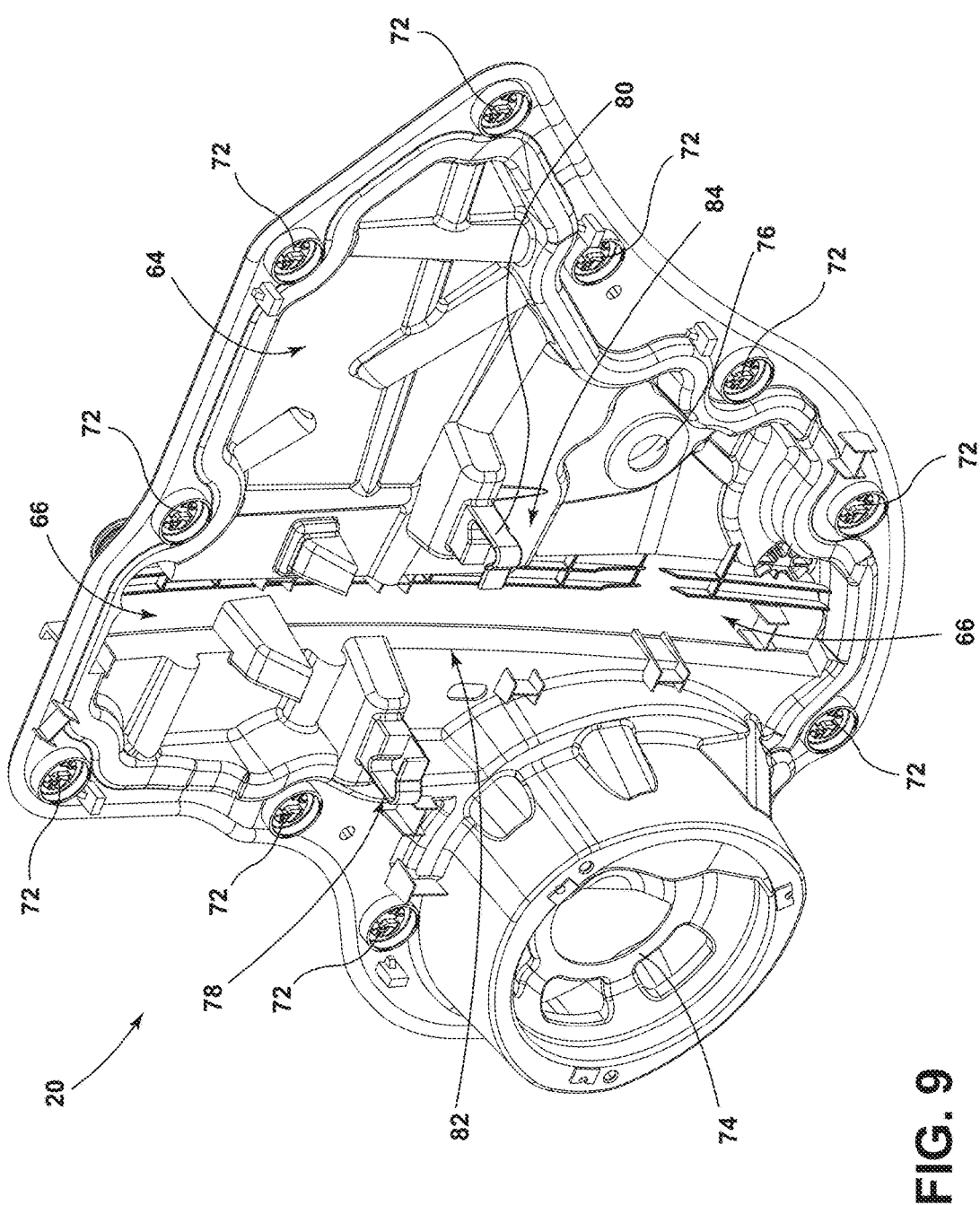
FIG. 9 is a perspective view of the integrated window regulator carrier of FIG. 2, illustrating a first receiver on one side of a vertical channel and a second receiver on another side of the vertical channel.
Figure 10:
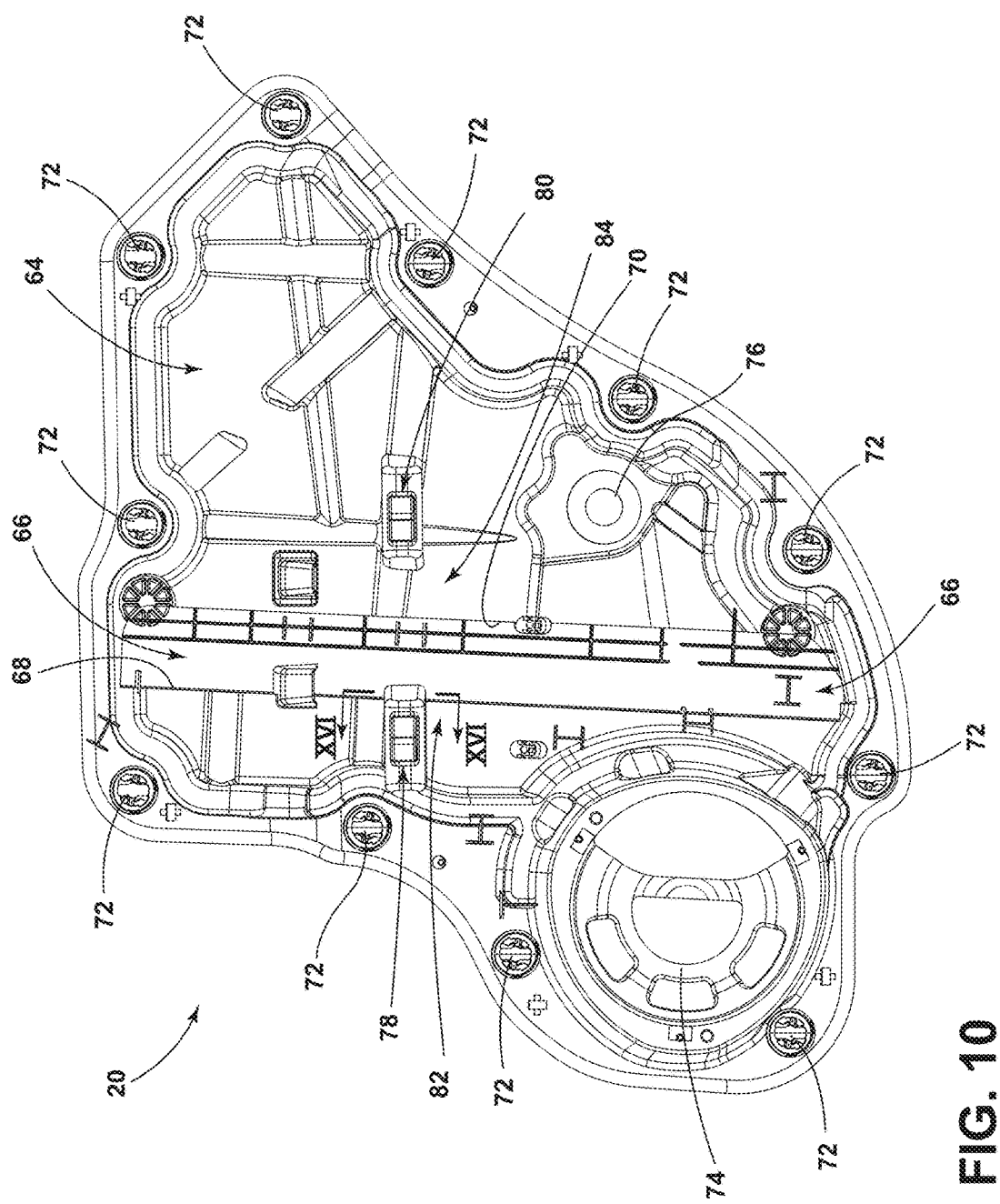
FIG. 10 is a front view of the integrated window regulator carrier of FIG. 2, illustrating an interior facing side.
Figure 11:
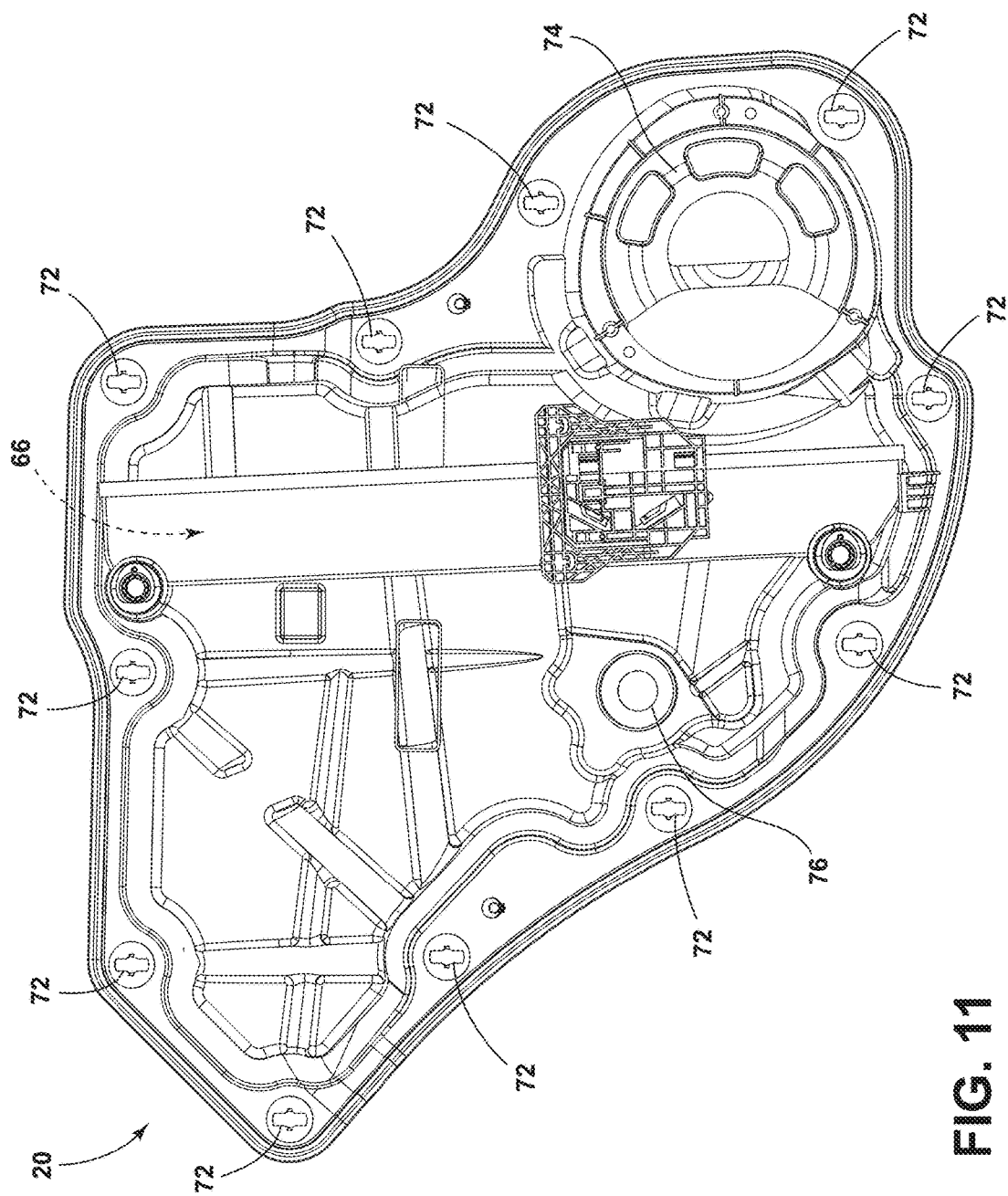
FIG. 11 is a rear view of the integrated window regulator carrier of FIG. 2.

For purposes of description herein, the terms "upper," "lower," "right," "left," "rear," "front," "vertical," "horizontal," and derivatives thereof shall relate to the disclosure as oriented in FIGS. 1-3. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, a vehicle 10 includes a passenger door assembly 12. The passenger door assembly 12, when closed, separates an interior 14 of the vehicle 10 from an exterior 16. The vehicle 10 can be a car, truck, or van, among other things.

The passenger door assembly 12 includes a frame 18, an integrated window regulator carrier 20 attached to the frame 18, and an interior door trim panel 22 that is also attached to the frame 18 and covers the integrated window regulator carrier 20. The passenger door assembly 12 further includes a bracket 24 that interconnects with both the integrated window regulator carrier 20 and the interior door trim panel 22. The frame 18 can be made from sheet metal, among other materials. The frame 18 can be attached to the vehicle 10 with hinge assemblies (not shown), allowing the passenger door assembly 12 to open and close, which allows a passenger to enter and exit the interior 14 of the vehicle 10.

Referring to FIGS. 3-8, the bracket 24 includes an elongated middle portion 26, a first end portion 28, and a second end portion 30. The second end portion 30 is opposite the first end portion 28, that is, located on the opposite end of the bracket 24 as the first end portion 28. The elongated middle portion 26 is between the first end portion 28 and the second end portion 30. The bracket 24 can be symmetrical about a midline 32 through the elongated middle portion 26. As will be apparent below, the symmetrical shape of the bracket 24 allows for easier assembly of the passenger door assembly 12.

The first end portion 28 has a first width 34a, which can be parallel to the midline 32, at a first point 36a. The first end portion 28 has a second width 38a, parallel to the first width 34a and the midline 32, at a second point 40a. The second width 38a is wider than the first width 34a. The first point 36a is closer to the elongated middle portion 26 (and the midline 32) than the second point 40a. Because the embodiment illustrated herein is symmetrical about the midline 32, the second end portion 30 likewise has a first width 34b, which can be parallel to the midline 32, at a first point 36b and a second width 38b, parallel to the first width 34b, at a second point 40b that is wider than the first width 34b. Again, the first point 36b of the second end portion 30 is closer to the elongated middle portion 26 (and the midline 32) than the second point 40b. In other words, at least part of the first end portion 28 is wider relative to another part of the first end portion 28 and at least part of the second end portion 30 is wider relative to another part of the second end portion 30. As will become apparent below, the widening aspect of the first end portion 28 and the second end portion 30 provides a visual cue when the bracket 24 is assembled with the passenger door assembly 12.

The bracket 24 further includes a top wall 42. The top wall 42 can have planar top surface portion 44 that runs throughout the entirety of the bracket 24 or a portion of the bracket 24. In the embodiment illustrated herein, the top wall 42 has a planar top surface portion 44 essentially the entire length of the bracket 24, including from the first end portion 28 to the second end portion 30.

The bracket 24 further includes a first side wall 46. The first side wall 46 extends downward relative to the top wall 42 (that is, when the planar top surface portion 44 is facing upward). The first side wall 46 extends from the first end portion 28 to the second end portion 30. The bracket 24 further includes a second side wall 48 opposite the first side wall 46; that is, the second side wall 48 is on the opposite side of the bracket 24 as the first side wall 46. The second side wall 48 also extends downward relative to the top wall 42 (that is, when the planar top surface portion 44 is facing upward) and likewise extends from the first end portion 28 to the second end portion 30. The first side wall 46 and the second side wall 48 can form one contiguous wall about the perimeter of the bracket 24. The first side wall 46 has a planar exterior surface portion 50a, which can be orthogonal to the planar top surface portion 44 of the top wall 42. The second side wall 48 also has a planar exterior surface portion 50b, which can be orthogonal to the planar top surface portion 44 of the top wall 42.

The first side wall 46, the second side wall 48, and the top wall 42 form an interior chamber 52. In other words, the bracket 24 can be formed (such as by injection molding) to be largely hollow, bounded by the top wall 42, the first side wall 46, and the second side wall 48. The bracket 24 can further include strengthening portions 54 disposed within the interior chamber 52 extending between, and contiguous with, the first side wall 46 and the second side wall 48. The strengthening portions 54 can be contiguous with the top wall 42. The strengthening portions 54 can be configured to form any of a variety of geometric shapes, so as to provide different levels of strength profiles to the bracket 24.

The bracket 24 can further comprise one or more snap-fit fasteners 56 (e.g., 56a, 56b), such as the snap-fit fastener 56a disposed at the first end portion 28 and the snap-fit fastener 56b disposed at the second end portion 30. The snap-fit fasteners 56 can extend downward relative to the top wall 42. Each of the snap-fit fasteners 56 can include the same features. For example, snap-fit fastener 56b (see FIG. 6) includes a cantilever portion 58b, which extends downward relative to the top wall 42, that terminates with a catch flange 60b. Each of the snap-fit fasteners 56 engages with a snap-fit receiver on the integrated window regulator carrier 20, as discussed below. The bracket 24 can further include an aperture 62 (see FIG. 4), which provides a connection opportunity as discussed below. The aperture 62 can be located at the midline 32 and disposed through the top wall 42. The bracket 24 is preferably molded plastic. As further discussed below, the bracket 24 can be connected to the integrated window regulator carrier 20 and the interior door trim panel 22 can be connected to the bracket 24.

Referring now to FIGS. 9-19, the integrated window regulator carrier 20 has an interior facing side 64. The interior facing side 64 is the side that is closest to the interior 14 of the vehicle 10, when the passenger door assembly 12 is closed. The interior facing side 64 is the side that abuts the interior door trim panel 22. The integrated window regulator carrier 20 includes a vertical channel 66 that is recessed into the interior facing side 64 and a first channel wall 68 and a second channel wall 70 can define the lateral edges of the vertical channel 66. The integrated window regulator carrier 20 includes a plurality of attachment points 72 at which the integrated window regulator carrier 20 is attached to the frame 18. The integrated window regulator carrier 20 may further include a speaker hub 74, to which an audio speaker can be mounted, and an aperture 76 through which a window regulator motor shaft may extend. The integrated window regulator carrier 20 provides a mounting support structure for a window regulator assembly (not shown), which regulates the raising and lowering of a window pane included therewith. Various wiring (not shown) associated with the window regulator assembly may be attached to the integrated window regulator carrier 20.

The integrated window regulator carrier 20 further comprises a first receiver 78 for the bracket 24. The first receiver 78 is disposed to a first side 82 of the vertical channel 66. The first receiver 78 projects outward from the interior facing side 64. The integrated window regulator carrier 20 further comprises a second receiver 80 for the bracket 24. The second receiver 80 is opposite the first receiver 78; that is, the second receiver 80 is disposed at a second side 84 of the vertical channel 66. Like the first receiver 78, the second receiver 80 projects outward from the interior facing side 64.

The first receiver 78 and the second receiver 80 can include the same features; that is, the first receiver 78 and the second receiver 80 can be mirror images of each other. Thus, only the features of the first receiver 78 will be herein discussed, understanding that the second receiver 80 also includes all of those features. In this regard, the first receiver 78 includes a first retaining surface 86a (see FIGS. 16 and 17) and a second retaining surface 88a. The second retaining surface 88a is opposite the first retaining surface 86a and faces the first retaining surface 86a. As will be apparent below, the first retaining surface 86a and the second retaining surface 88a abut the bracket 24 when assembled as part of the passenger door assembly 12 and oppose the opening and closing forces that the bracket 24 imposes on the first receiver 78 and the second receiver 80, respectively, when a passenger uses the grab handle 188 (discussed below) of the interior door trim panel 22 to open and close the passenger door assembly 12 from the interior 14 of the vehicle 10.

The first receiver 78 includes a bottom retaining surface 90a that lies between the first retaining surface 86a and the second retaining surface 88a. The bottom retaining surface 90a, as discussed below, supports and abuts the bracket 24 when assembled as part of the passenger door assembly 12. The bottom retaining surface 90a, the first retaining surface 86a, and the second retaining surface 88a can be planar. Further, the first retaining surface 86a and the second retaining surface 88a can be parallel to each other and orthogonal to the bottom retaining surface 90a.

The first receiver 78 further includes a lateral retaining surface 92a. The lateral retaining surface 92a can include a planar portion orthogonal to the bottom retaining surface 90a and orthogonal to both the first retaining surface 86a and the second retaining surface 88a. The lateral retaining surface 92a of the first receiver 78 faces the lateral retaining surface 92b of the second receiver 80. As discussed below, the first receiver 78 and the second receiver 80 thus support the bracket 24, when assembled into the passenger door assembly 12, from below the bracket 24, to one side of the bracket 24, to an opposing side of the bracket 24, and laterally on both sides of the bracket 24.

The planar portion of the lateral retaining surface 92a has a length 94a parallel to the bottom retaining surface 90a. This length 94a is longer than a parallel distance 96a between the first retaining surface 86a and the second retaining surface 88a.

The first receiver 78 can further include a first transition surface portion 98a that forms a contiguous surface transition between the first retaining surface 86a and the lateral retaining surface 92a. The first receiver 78 can further include a second transition surface portion 100a that forms a contiguous surface transition between the second retaining surface 88a and the lateral retaining surface 92a. The first transition surface portion 98a and the second transition surface portion 100a can be orthogonal to the bottom retaining surface 90a. The transition from the first retaining surface 86a and first transition surface portion 98a forms an obtuse angle 102a. Likewise, the transition from the second retaining surface 88a and the second transition surface portion 100a forms an obtuse angle 104a. The obtuse angles 102a, 104a represent a widening of the first receiver 78 to accept the first end portion 28 of the bracket 24, providing another visual cue for assembly.

Figure 12:
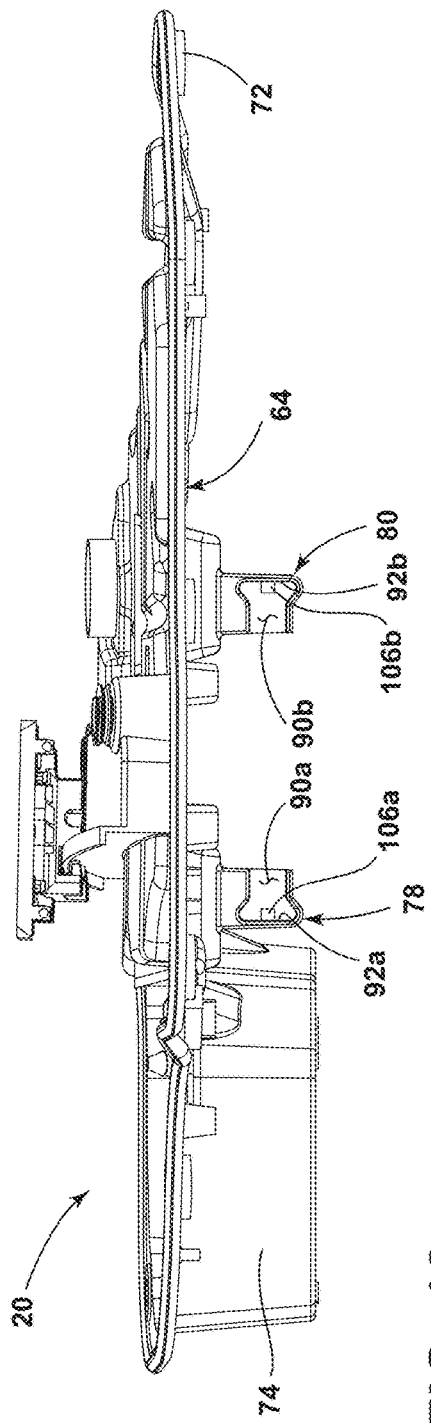
FIG. 12 is a top view of the integrated window regulator carrier of FIG. 2, illustrating a lateral retaining surface, a bottom retaining surface, and a snap-fit receiver of both the first receiver and the second receiver.
Figure 13:
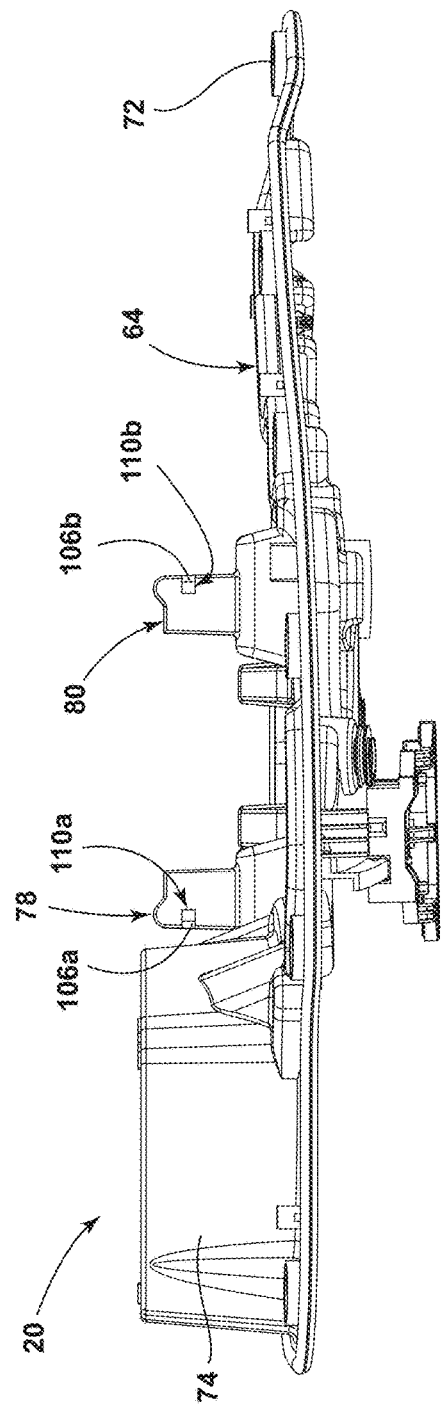
FIG. 13 is a bottom view of the integrated window regulator carrier of FIG. 2, illustrating an aperture forming the snap-fit receiver on both the first receiver and the second receiver.
Figure 15:
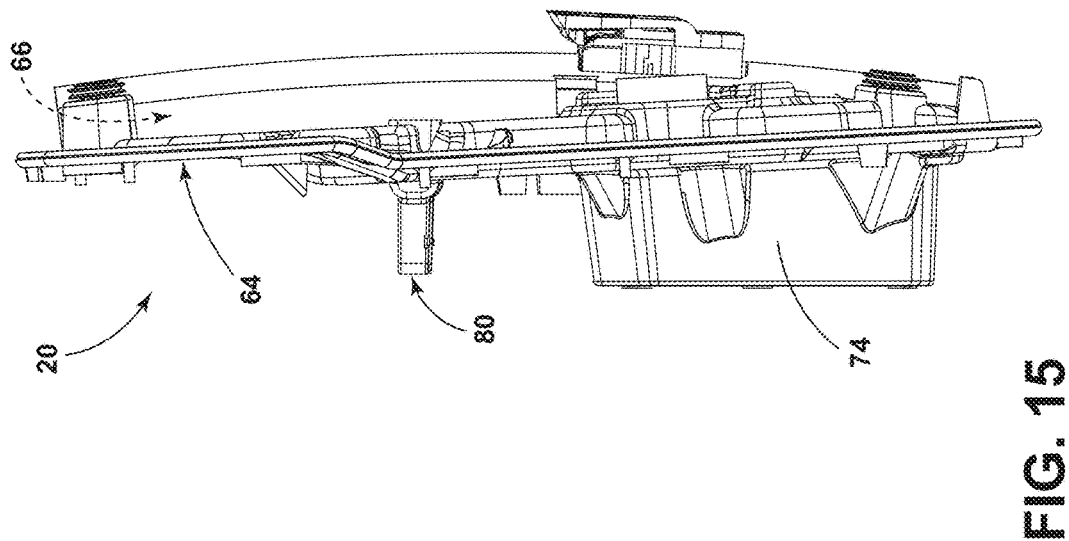
FIG. 15 is a side view of the other side of the integrated window regulator carrier of FIG. 2, illustrating the vertical channel recessed into the interior facing side.
Figure 14:
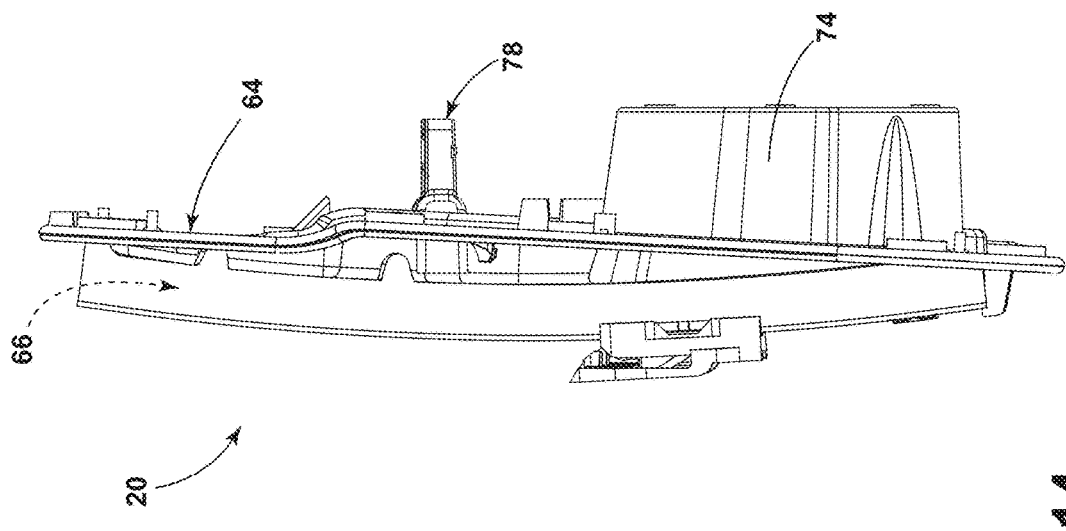
FIG. 14 is a side view of the integrated window regulator carrier of FIG. 2, illustrating the vertical channel recessed into the interior facing side.
Figure 16:
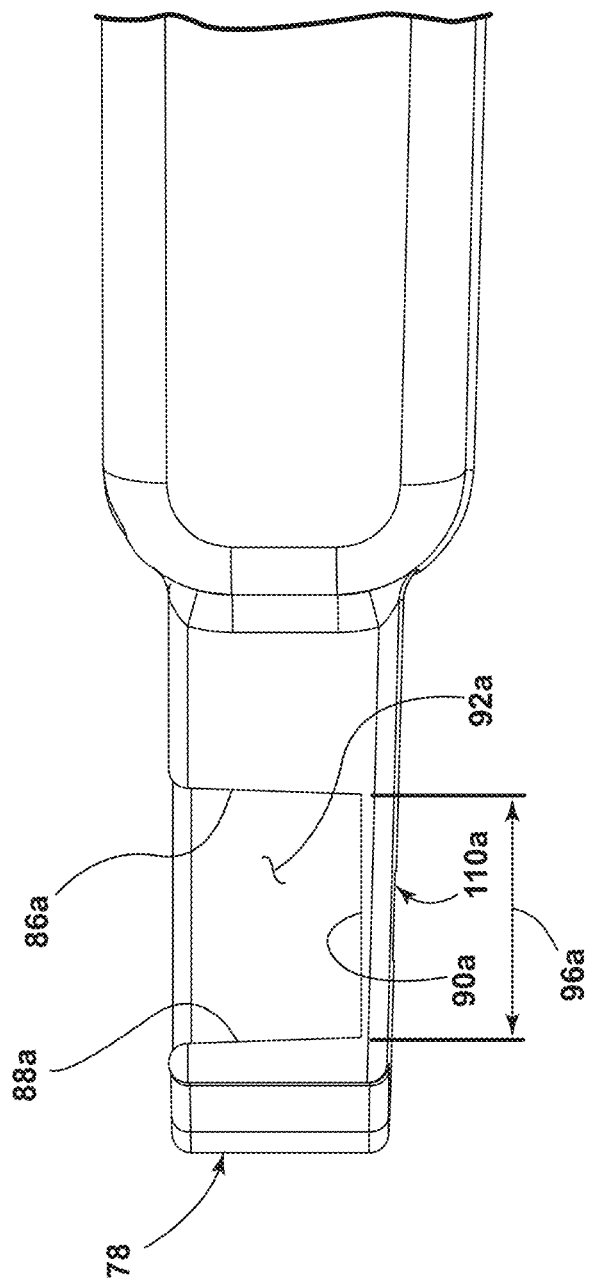
FIG. 16 is a cross-sectional view of the integrated window regulator carrier of FIG. 2, taken through line XVI-XVI of FIG. 10, illustrating a first retaining surface and an opposing second retaining surface on the first receiver.
Figure 17:
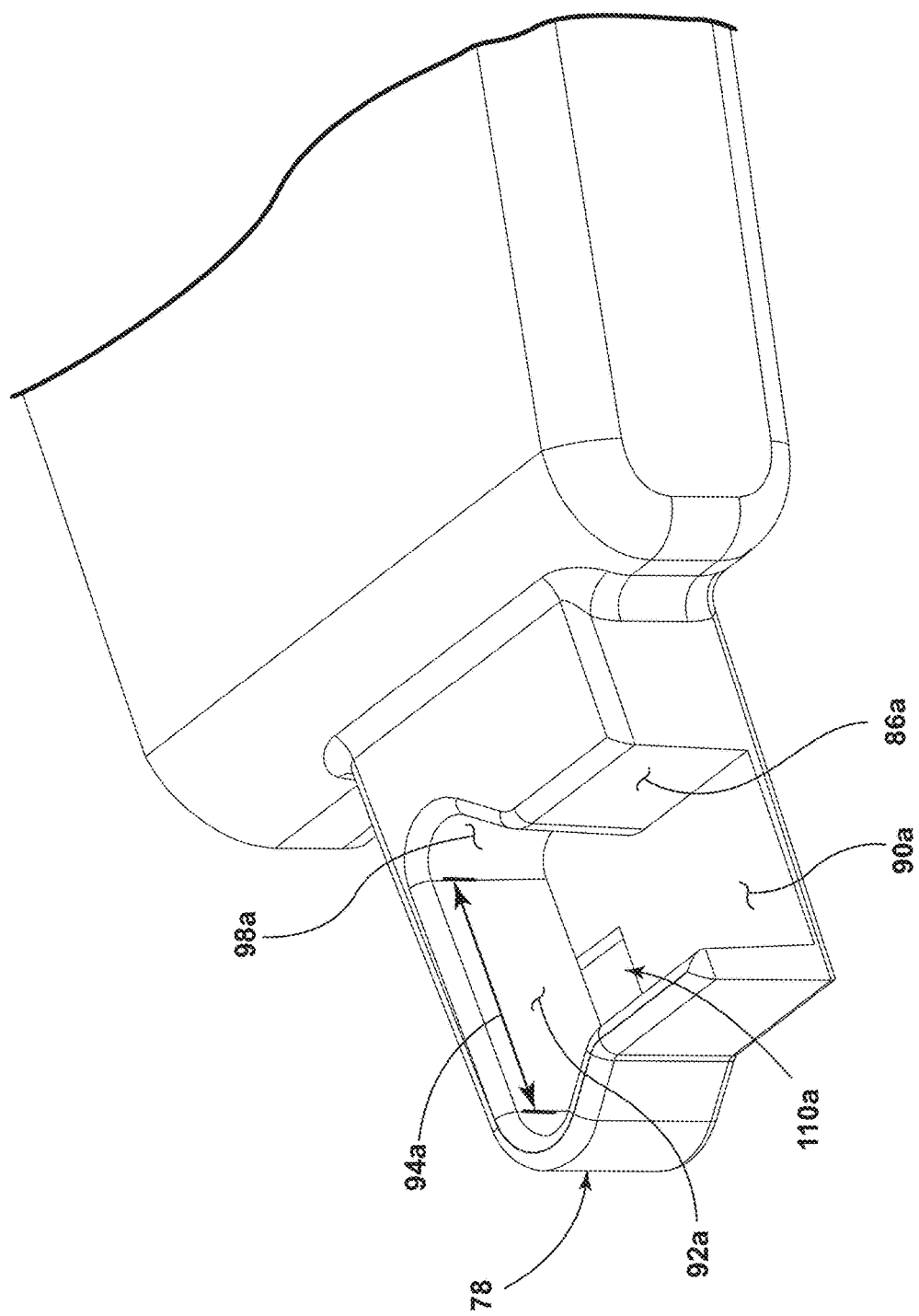
FIG. 17 is a perspective view of the portion of the integrated window regulator carrier of FIG. 2 illustrated at FIG. 16, showing a first transition surface portion between the first retaining surface and the lateral retaining surface.
Figure 18:
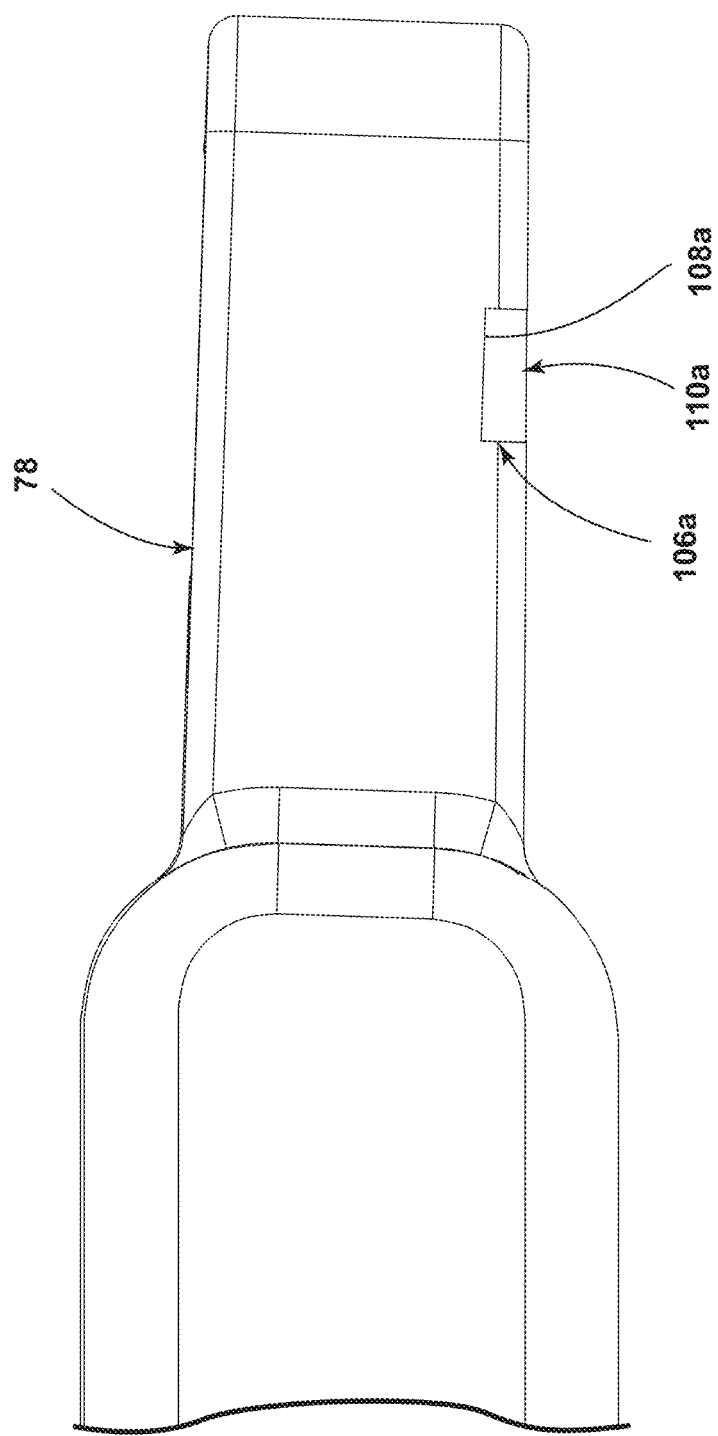
FIG. 18 is a side view of the portion of the integrated window regulator carrier of FIG. 2 illustrated at FIG. 16, showing the aperture and a catch abutting surface of the snap-fit receiver of the first receiver.
Figure 19:
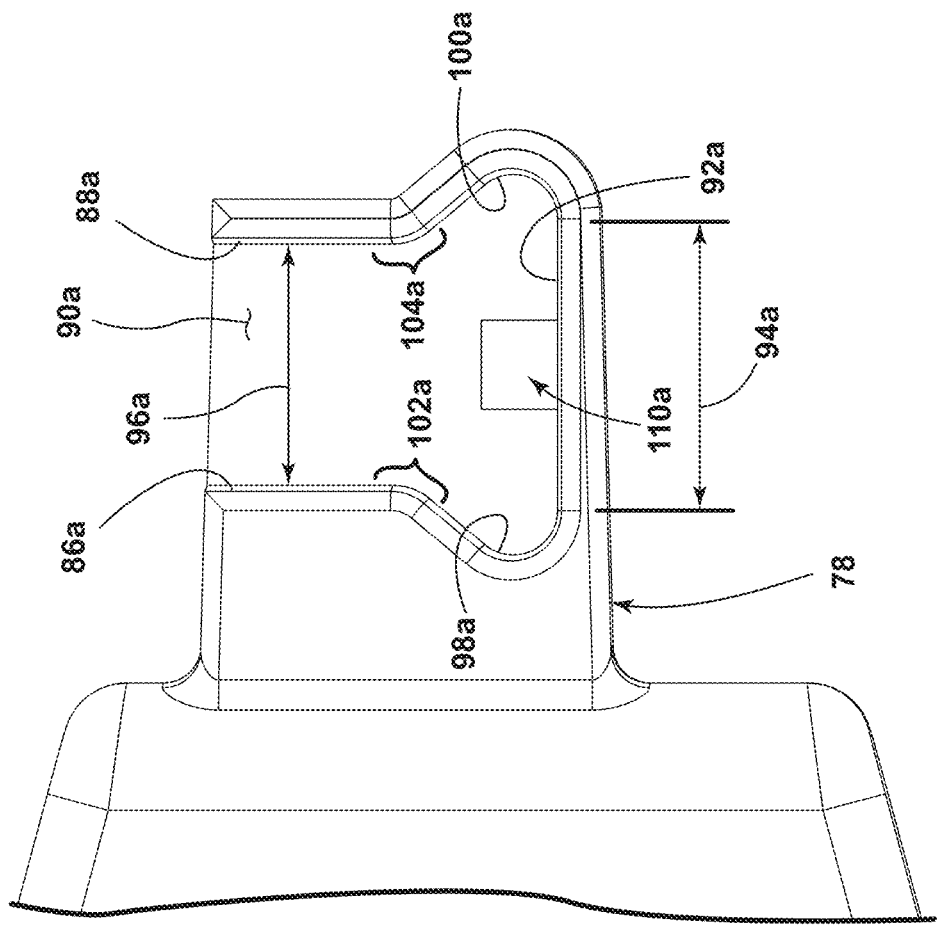
FIG. 19 is an overhead view of the portion of the integrated window regulator carrier of FIG. 2 illustrated at FIG. 16, showing the first receiving surface and the first transition surface portion forming an obtuse angle.
Figure 20:
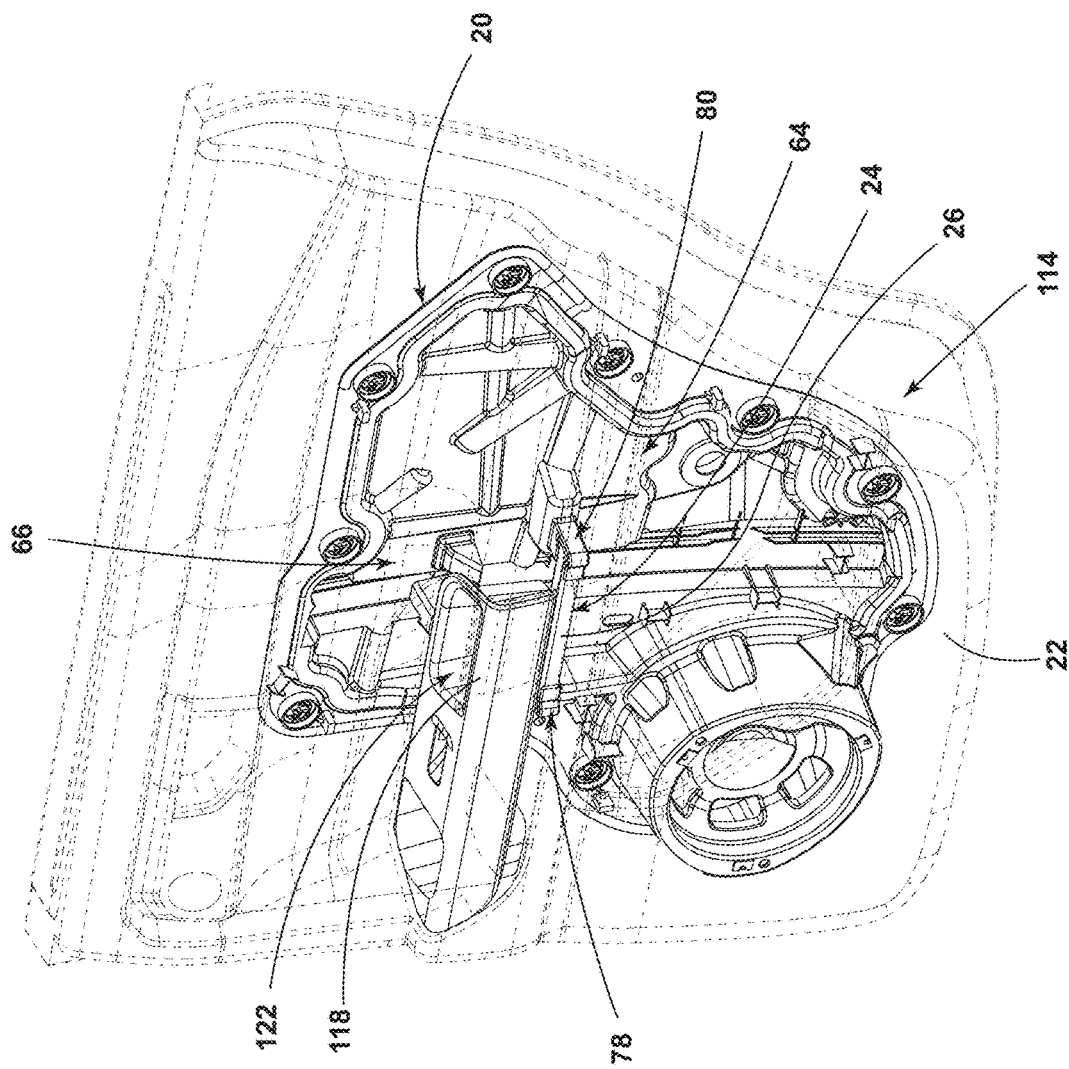
FIG. 20 is a perspective view of the passenger door assembly of FIG. 2 (less the frame) illustrating the interior door trim panel of FIG. 2 attached to the bracket, which is received by the first receiver and the second receiver of the integrated window regulator carrier.
Figure 21:
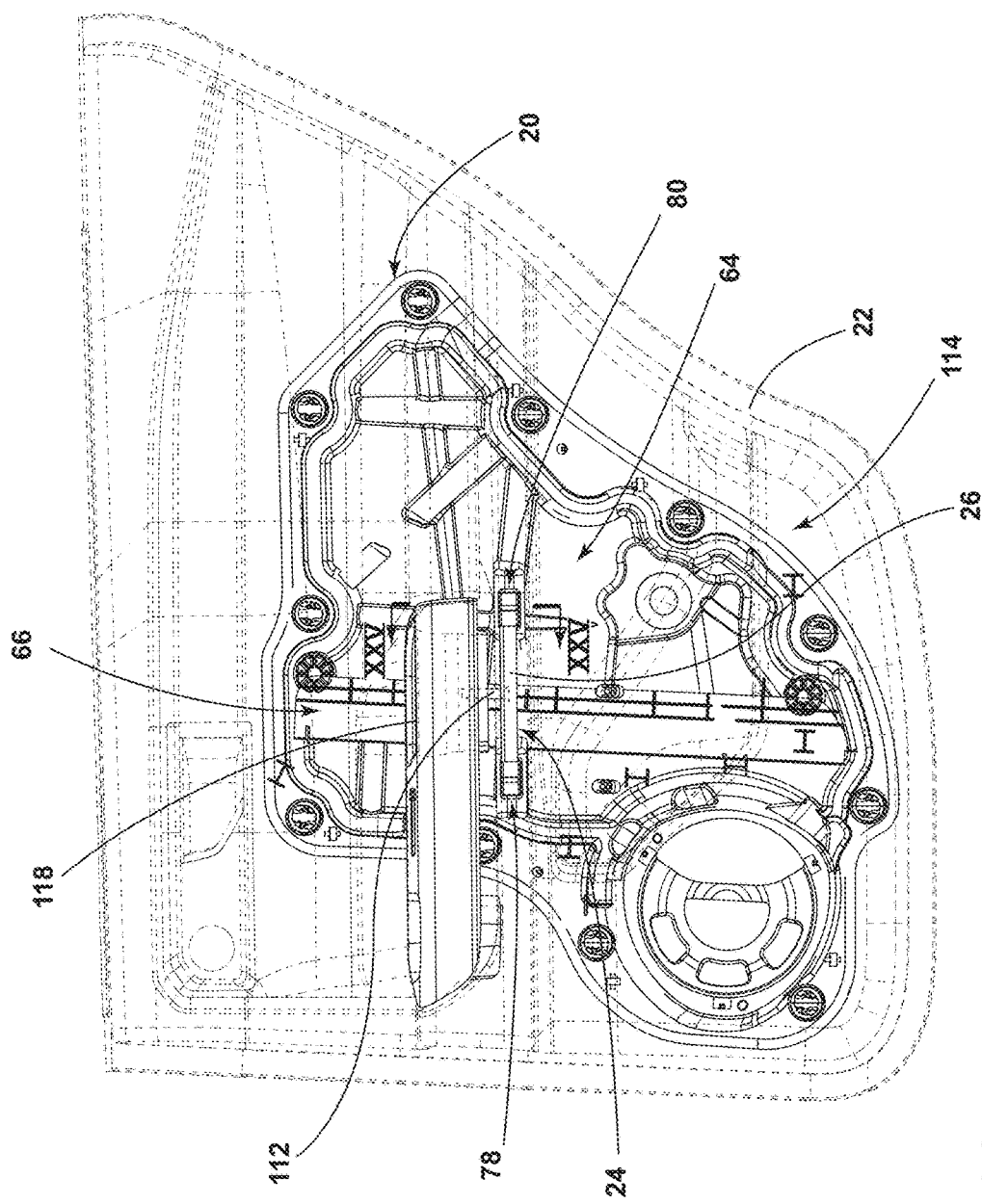
FIG. 21 is a front view of the passenger door assembly of FIG. 20, illustrating a connector connecting the interior door trim panel at the grab handle to the bracket.
Figure 23:
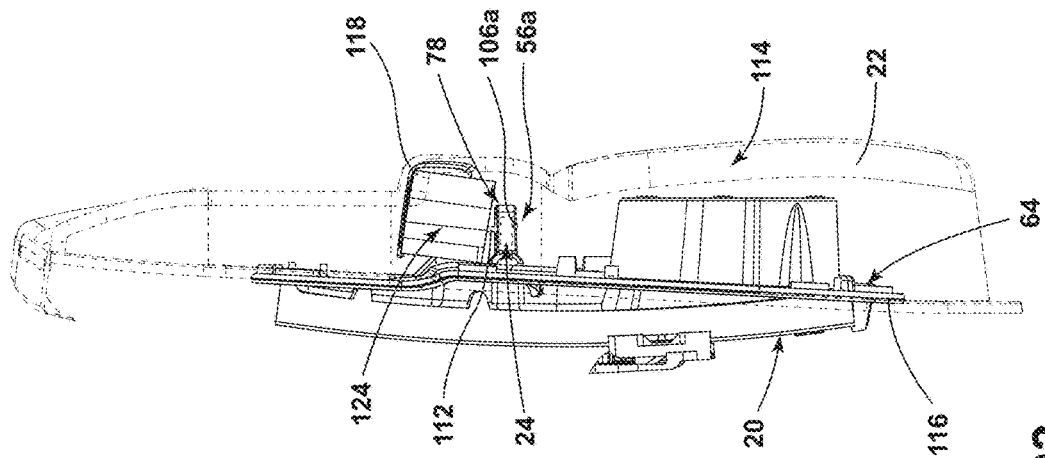
FIG. 23 is a side view of the other side of the passenger door assembly of FIG. 20.
Figure 22:
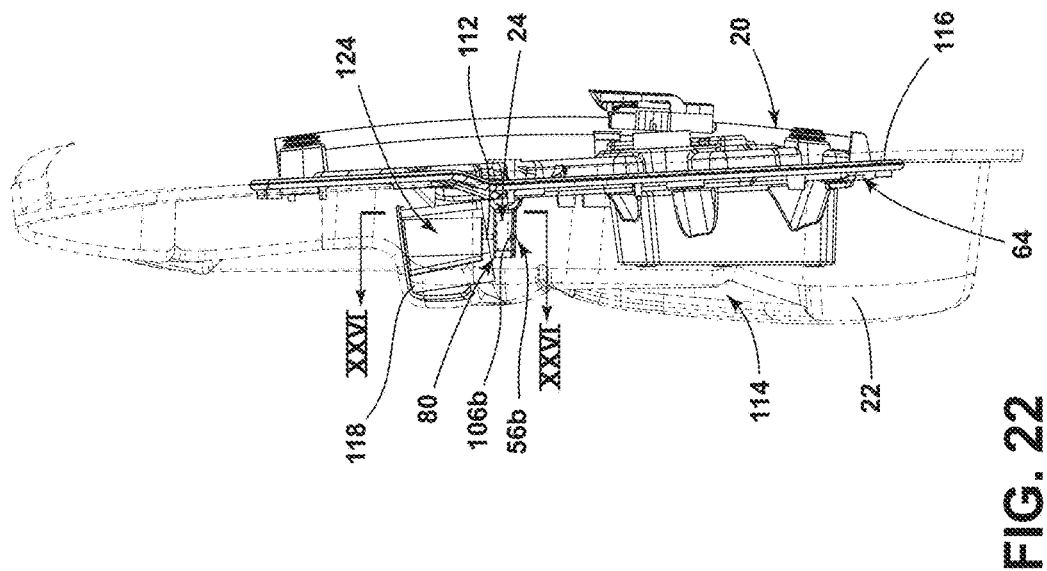
FIG. 22 is a side view of the passenger door assembly of FIG. 20, illustrating the grab handle forming a protrusion on the other side of the interior door trim panel, which protrusion is attached to the bracket via the connector.
Figure 24:
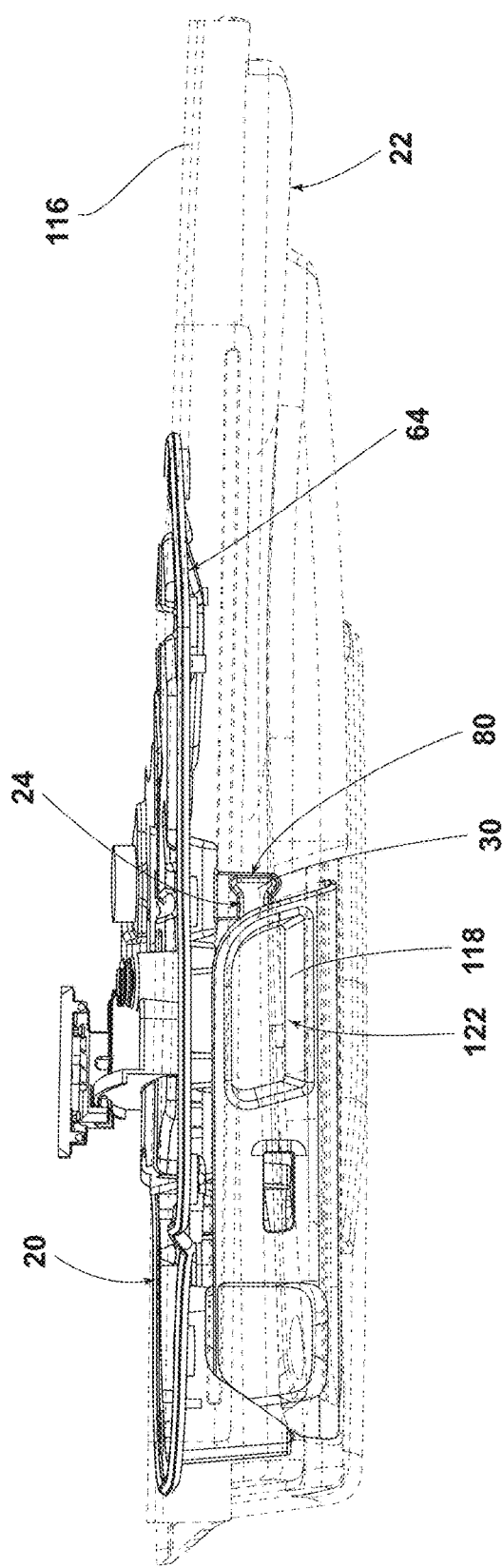
FIG. 24 is an overhead view of the passenger door assembly of FIG. 20, illustrating the recess part of the grab handle.
Figure 25:
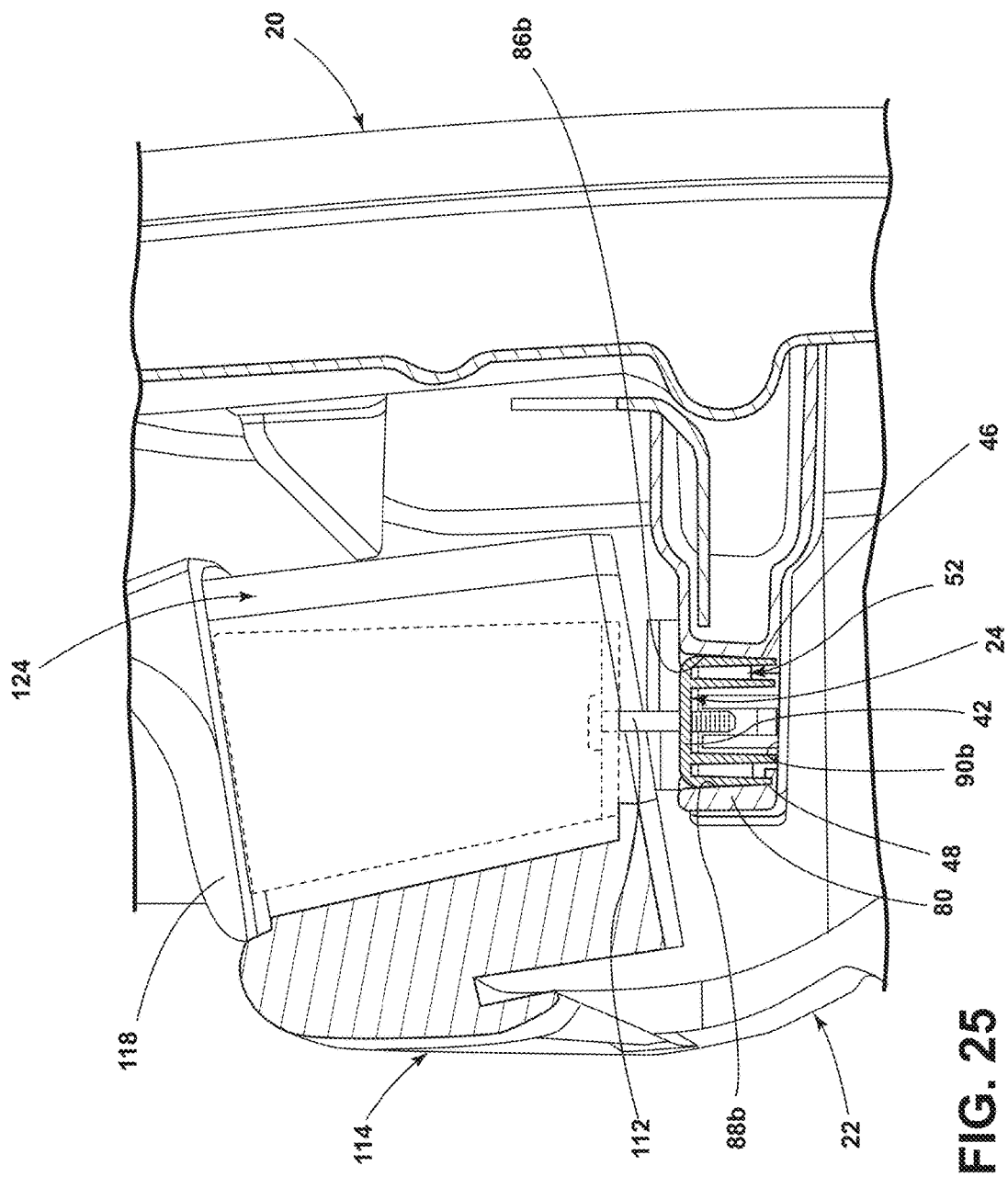
FIG. 25 is a cross-sectional view of the passenger door assembly of FIG. 20 taken through line XXV-XXV of FIG. 21, illustrating the bottom retaining surface of the second receiver retaining the second end portion of the bracket.
Figure 26:
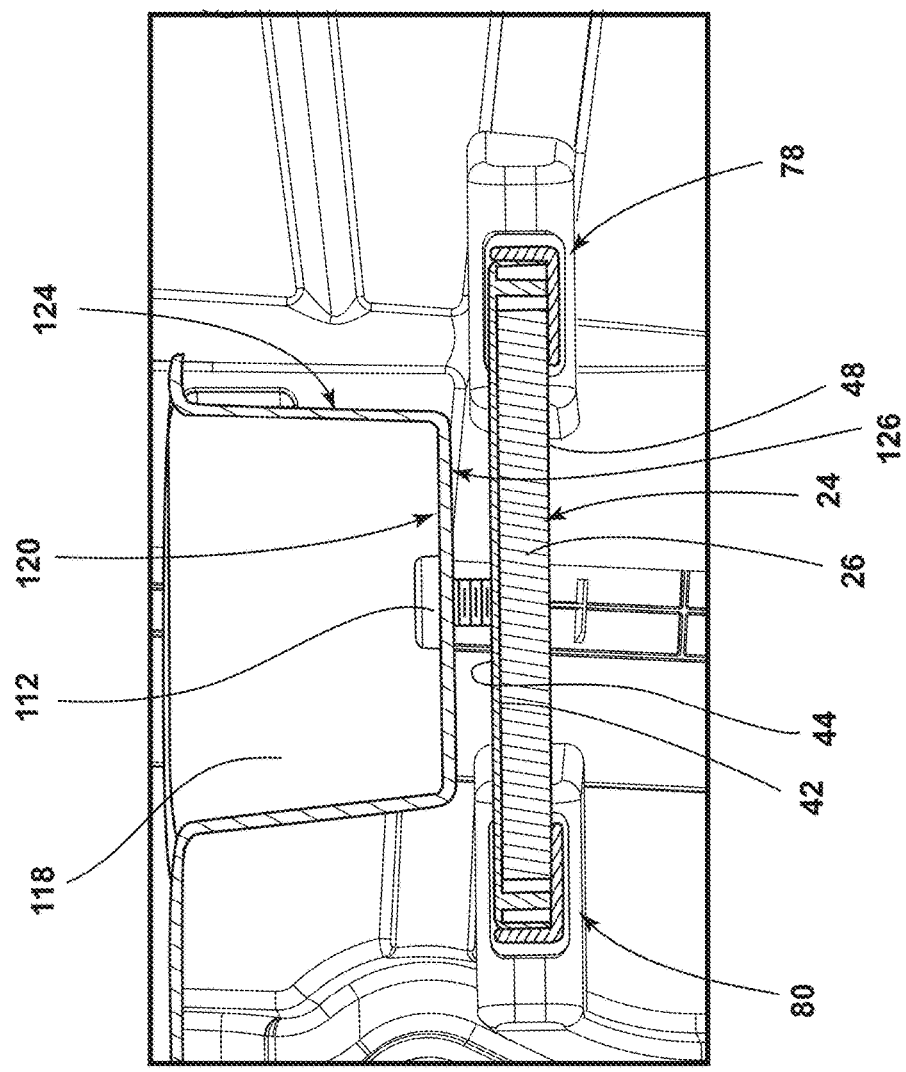
FIG. 26 is a cross-sectional view of the passenger door assembly of FIG. 20 taken through line XXVI-XXVI of FIG. 22, illustrating a planar horizontal surface of the protrusion of the interior door trim facing the planar top surface of the top wall of the bracket.

The first receiver 78 further includes a snap-fit receiver 106a (see, e.g., FIG. 12). The snap-fit receiver 106a is configured to receive and connect with the snap-fit fastener 56a on the bracket 24, when assembled into the passenger door assembly 12. Accordingly, the snap-fit receiver 106a includes a catch abutting surface 108a, accessible through an aperture 110a, that "catches" the catch flange 60a of the snap-fit fastener 56a.

Although the embodiment of the bracket 24 disclosed herein is symmetrical about the midline 32 and the first receiver 78 and the second receiver 80 accommodate this symmetry, the bracket 24 need not be symmetrical. In such an asymmetrical embodiment of the bracket 24, the first receiver 78 and the second receiver 80 are shaped to match the end portion and the second end portion of the asymmetrical bracket 24, so that the bracket 24 can only be attached to the integrated window regulator carrier 20 in the correct orientation.

Referring now to FIGS. 20-26, an embodiment of the passenger door assembly 12, without the frame 18, is illustrated, showing the bracket 24 connected to the interior door trim panel 22, via a connector 112. The first receiver 78 of the integrated window regulator carrier 20 has received and is connected to the first end portion 28 of the bracket 24. The second receiver 80 of the integrated window regulator carrier 20 has received and is connected to the second end portion 30 of the bracket 24. The bottom retaining surface 90a of the first receiver 78 and the bottom retaining surface 90b of the second receiver 80 both face the bracket 24. The first retaining surface 86a of the first receiver 78 faces the first side wall 46 of the bracket 24, adjacent the first end portion 28 of the bracket 24. The second retaining surface 88a of the first receiver 78 faces the second side wall 48 of the bracket 24, adjacent the first end portion 28 of the bracket 24. Likewise, the first retaining surface 86b (see FIG. 25) of the second receiver 80 faces the first side wall 46 of the bracket 24, adjacent the second end portion 30 of the bracket 24, and the second retaining surface 88b of the second receiver 80 faces the second side wall 48 of the bracket 24, adjacent the second end portion 30 of the bracket 24. The snap-fit receiver 106a of the first receiver 78 has connected with the snap-fit fastener 56a on the first end portion 28 of the bracket 24. The snap-fit receiver 106b of the second receiver 80 has connected with the snap-fit fastener 56b on the second end portion 30 of the bracket 24.

The interior door trim panel 22 includes an interior side 114 (see FIGS. 2 and 20), which faces the interior 14 of the vehicle 10 when the passenger door assembly 12 is closed. The interior door trim panel 22 further includes another side 116, which is opposite the interior side 114, facing the integrated window regulator carrier 20. The interior door trim panel 22 further includes a grab handle 118, which is located at (accessible from) the interior side 114. The grab handle 118 is a handle that a passenger of the vehicle 10 can grab to pull the passenger door assembly 12 and therefore close the passenger door assembly 12 when the passenger is in the interior 14 of the vehicle 10 and the passenger door assembly 12 is open.

The interior door trim panel 22 is connected to the bracket 24 near the grab handle 118. For example, the connector 112 can be disposed through an aperture in a bottom wall 120 of the grab handle 118, through the interior door trim panel 22 to the other side, and into the aperture 62 in the bracket 24, thus connecting the grab handle 118 to the bracket 24. The grab handle 118 can take the form of a recess 122 in the interior door trim panel 22 at the interior side 114. The other side 116 of interior door trim panel 22 can have a protrusion 124 generally matching the recess 122. The protrusion 124 thus faces the integrated window regulator carrier 20. The interior door trim panel 22 can be connected with the bracket 24 at this protrusion 124. The aperture 62 of the bracket 24 can be placed at the elongated middle portion 26 of the bracket 24, allowing the interior door trim panel 22 to be interconnected with the bracket 24 at the elongated middle portion 26 of the bracket 24. The protrusion 124 has a planar horizontal surface 126 (see FIG. 26). The planar horizontal surface 126 faces the planar top surface portion 44 of the top wall 42 of the bracket 24.

When an integrated window regulator carrier 20 has one vertical channel 66 centrally located and the integrated window regulator carrier 20 is part of a passenger door assembly 12 including an interior door trim panel 22 with a grab handle 118, it is beneficial to attach the interior door trim panel 22 to the integrated window regulator carrier 20 at the grab handle 118. Attaching the interior door trim panel 22 to the integrated window regulator carrier 20 of the present disclosure via the bracket 24 of the present disclosure prevents the grab handle 118 area of the interior door trim panel 22 from bowing inward when the passenger pulls the passenger door assembly 12 closed. Because the bracket 24 spans the vertical channel 66 of the integrated window regulator carrier 20, the interior door trim panel 22 is attached to the integrated window regulator carrier 20 at the grab handle 118 area, but the attachment does not interfere with the vertical channel 66 or items attached to the integrated window regulator carrier 20 in the vertical channel 66. Because the bracket 24 can be a plastic molded component, the use of an expensively stamped metal bracket is avoided. Additionally, stamped metal brackets are heavier and difficult to attach to the integrated window regulator carrier 20. Moreover, because the bracket 24 can be symmetrical, the bracket 24 can be used with a passenger door assembly 12 on both the right and left sides of the vehicle 10, which may not be possible with stamped metal brackets.

Further, the bracket 24, because it can be made with plastic, is safer to passengers of the vehicle 10 than a stamped metal bracket if another vehicle collides with the passenger door assembly 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A bracket to interconnect a first component and a second component of a vehicle comprising:
   a first end portion having a first snap-fit fastener;
   a second end portion having a second snap-fit fastener;
   an elongated middle portion disposed between the first end portion and the second end portion; and
   the first end portion, the second end portion, and the elongated middle portion each having parallel widths, with the widths of the first end portion and the second end portion being wider than the width of the elongated middle portion.

2. The bracket of claim 1 further comprising:
   a midline that extends though the elongated middle portion; and
   the bracket is symmetrical about the midline.

3. The bracket of claim 1,
   the first end portion and the second end portion each including a first width at a first point, and a second width at a second point; and
   the second width is parallel to the first width, wider than the first width, and further away from the elongated middle portion than the first width.

4. The bracket of claim 3 further comprising:
   a planar surface that is parallel with the first width and the second width, and disposed across essentially an entire length of the bracket from the first end portion to the second end portion.

5. The bracket of claim 4 further comprising:
   a top wall providing the planar surface;
   a first side wall extending orthogonally away from the top wall;
   a second side wall on the opposite side of the bracket as the first side wall, the second side wall extending orthogonally away from the top wall; and
   the first side wall, the second side wall, and the top wall form an interior chamber.

6. The bracket of claim 5 further comprising:
   a midline that extends though the elongated middle portion, with the bracket being symmetrical about the midline;
   the first snap-fit fastener extends away from the top wall; and
   the second snap-fit fastener extends away from the top wall.

7. The bracket of claim 1 further comprising:
   a top wall providing a planar surface that is (a) parallel with the parallel widths of the first end portion, the second end portion, and the elongated middle portion, and (b) disposed across essentially an entire length of the bracket from the first end portion to the second end portion;
   a first side wall extending orthogonally away from the top wall;
   a second side wall on the opposite side of the bracket as the first side wall, the second side wall extending orthogonally away from the top wall;

the first side wall, the second side wall, and the top wall form an interior chamber; and strengthening portions disposed within the interior chamber extending between, and contiguous with, the first side wall and the second side wall.

8. The bracket of claim 7, the first snap-fit fastener extends away from the top wall; and the second snap-fit fastener extends away from the top wall.

9. The bracket of claim 1, each of the first snap-fit fastener and the second snap-fit fastener includes a cantilever portion that terminates with a catch flange.

10. The bracket of claim 1 further comprising:

an aperture disposed at the elongated middle portion and configured to receive a connector to connect either the first component or the second component of the vehicle to the bracket.

11. A bracket to interconnect a first component and a second component of a vehicle comprising:

a first end portion at one end of the bracket;

a second end portion at another end of the bracket; and an elongated middle portion between the first end portion and the second end portion;

the elongated middle portion having a width that is narrower than widths of the first end portion and the second end portion;

the elongated middle portion having top wall providing a top surface portion, a first side wall extending away from the top surface portion, and a second side wall extending away from the top surface portion and facing the first side wall; and the top wall, the first side wall, and the second side wall form an interior chamber within which strengthening portions are disposed extending between the first side wall and the second side wall.

12. The bracket of claim 11 further comprising:

a midline, and the bracket is symmetrical about the midline.

13. The bracket of claim 11, part of the first end portion is wider relative to another part of the first end portion; and part of the second end portion is wider relative to another part of the second end portion.

14. The bracket of claim 11, the top surface portion is planar.

15. The bracket of claim 14, the top surface portion extends a length of the bracket extending from the first end portion to the second end portion.

16. The bracket of claim 11, the first side wall and the second side wall each have a planar exterior surface portion that is orthogonal to the top surface portion of the top wall.

17. The bracket of claim 11, the strengthening portions are contiguous with the top wall.

18. The bracket of claim 11 further comprising:

one or more snap-fit fasteners.

19. The bracket of claim 18, the one or more snap-fit fasteners include a snap-fit fastener disposed at the first end portion, and another snap-fit fastener disposed at the second end portion.

20. The bracket of claim 11 further comprising:

an aperture disposed through the top wall configured to accept a fastener.

* * * * *